United States Patent [19]

Garretson et al.

[11] Patent Number: 4,829,957

[45] Date of Patent: May 16, 1989

[54] GASEOUS FUEL INJECTION SYSTEM FOR INTERNAL COMBUSTION ENGINES

[75] Inventors: Owen L. Garretson, Farmington, N. Mex.; Keith H. Garretson, Mt. Pleasant, Iowa

[73] Assignee: Garretson Equipment Co., Inc., Mt. Pleasant, Iowa

[21] Appl. No.: 217,470

[22] Filed: Jul. 11, 1988

[51] Int. Cl.⁴ .................................. F02B 3/0
[52] U.S. Cl. .................. 123/27 GE; 123/527
[58] Field of Search ................ 123/27 GE, 527

[56] References Cited

U.S. PATENT DOCUMENTS

| | | | |
|---|---|---|---|
| 3,152,583 | 10/1964 | Horgen et al. | 123/27 GE |
| 3,225,751 | 12/1965 | Horgen et al. | 123/27 GE |
| 3,687,119 | 8/1972 | Hoogeboom | 123/27 GE |
| 4,483,302 | 11/1984 | Mannessen | 123/527 |
| 4,499,885 | 2/1985 | Weissenbach et al. | 123/27 GE |
| 4,596,211 | 6/1986 | Szloboda | 123/27 GE |
| 4,632,083 | 12/1986 | Reggiani | 123/527 |
| 4,765,303 | 8/1988 | Jones | 123/527 |

Primary Examiner—E. Rollins Cross
Attorney, Agent, or Firm—Simmons, Perrine, Albright & Ellwood

[57] ABSTRACT

A gaseous fuel injection system for internal combustion engines features a "variable-pressure-controller" which translates a varying negative pressure, sensed in the engine's air intake system by means responsive to the rate of flow of the intake air, into a proportionately varying amount of gaseous fuel at a positive pressure. That fuel is then injected into the engine's air intake system upstream or downstream of the throttle valve through flow restrictor means which cooperate with the variable-pressure-controller to provide an amount of fuel proportionate to the rate of air flow through the engine's air intake system. The invention is entirely mechanical-pneumatic in operation and readily adapted to a wide variety of liquid fueled engines, carbureted as well as fuel injected, or to one for gaseous fuel only.

28 Claims, 4 Drawing Sheets

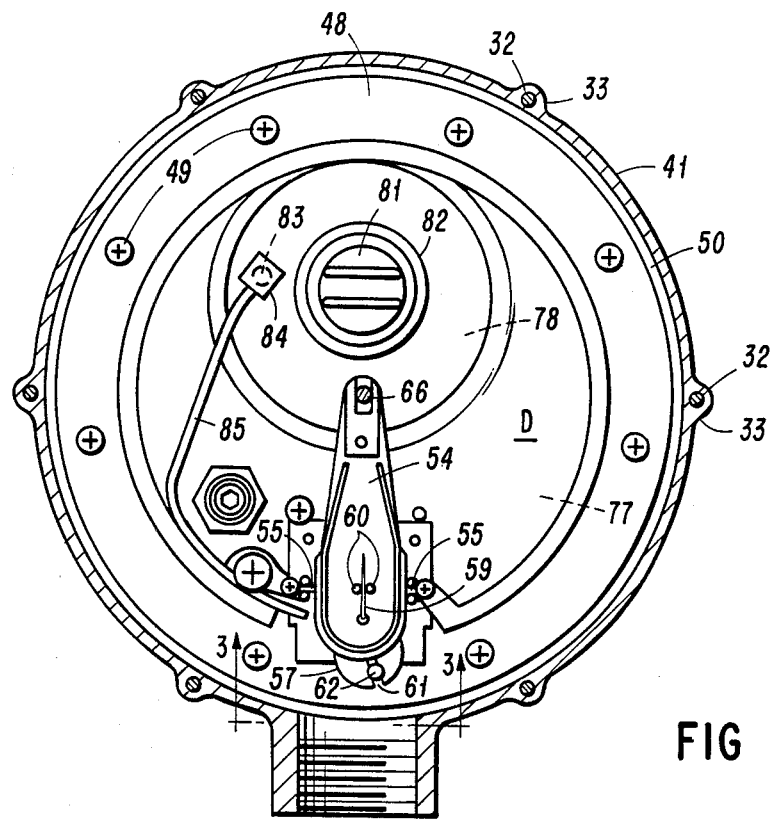
FIG 2
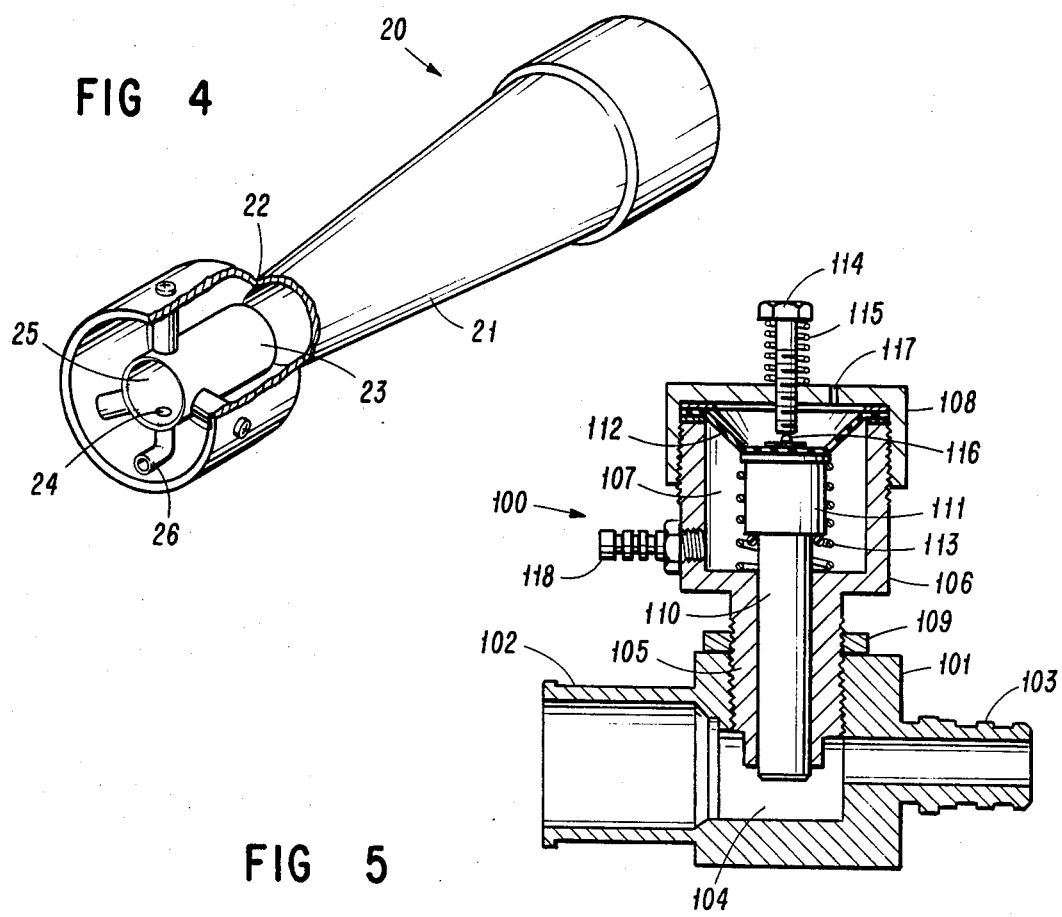
FIG 4
FIG 5

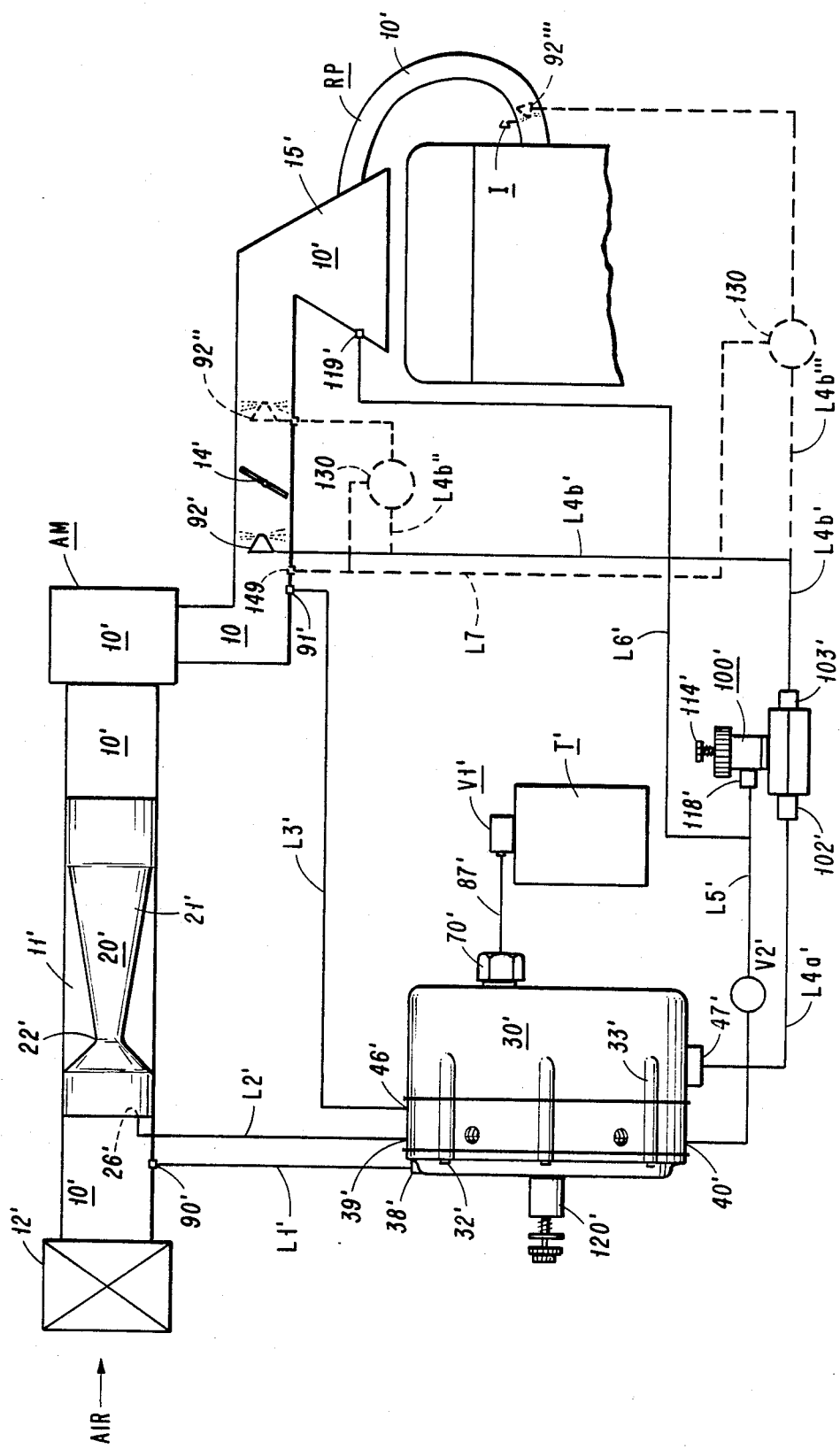

GASEOUS FUEL INJECTION SYSTEM FOR INTERNAL COMBUSTION ENGINES

BACKGROUND OF THE INVENTION (a) Field of the Invention

The present invention concerns internal Combustion engines and, more particularly, a gaseous fuel injection system for same utilizing mechanical and pneumatic means.

(b) The Prior Art

Internal combustion engines that operate on gaseous fuel only or alternately on liquid fuel are long and well-known. Typical such fuel systems employ a negative or less than ambient atmospheric pressure to, in effect, suck the gaseous fuel from a zero pressure governor. Usually the negative pressure is created by a venturi and the gaseous fuel enters the throat of the venturi from the zero pressure governor in amounts proportional to the decreases in the ambient pressure at the throat of the venturi which, in turn, is proportional to the rate of air flow through the venturi itself. In these systems, thus, the pressure of the gaseous fuel entering the engine's air intake system is always less than that of the ambient atmosphere. When a supercharger is also used, the foregoing is still true if "ambient" is considered to be the air pressure at the inlet of the engine's carburetion system, assuming the supercharger is upstream of the latter.

The venturis used in the foregoing systems are relatively large in diameter in order to minimize pressure loss, since the length of the typical venturi employed, such as that in a carburetor, is relatively short and therefore pressure recovery is not the best. The relatively large venturi diameter, however, impairs the strength of the "signal", as it were, transmitted to the zero pressure governor, especially at lower air speeds through the venturi, and so impairs control over the air-to-fuel ratio. Unlike the situation in the case of liquid fuels it is not possible to increase the strength of that "signal" by the use of a secondary or booster venturi within the main venturi in the case of gaseous fuels. This is because the gaseous fuel in conventional systems is introduced at the very point where the "signal" is taken, namely, the throat of the venturi, and unlike the situation with liquid fuels, a booster venturi is too small to be able to introduce enough gaseous fuel into the air to provide a proper air-to-fuel ratio (about one part fuel to fifteen parts air by weight in the case of hydrocarbon fuels) in view not only of the quantity of air through the booster venturi itself but also in view of the physical size needed to conduct fuel in the gaseous state in sufficient quantities.

The foregoing difficulties persist whether the engine is to operate on gaseous fuel alone or alternately on liquid fuel. In latter instances sometimes the venturi of the liquid fuel carburetor is used to introduce the gaseous fuel, or a separate venturi immediately upstream of the liquid fuel venturi is employed for the gaseous fuel, as in U.S. Pat. No. 4,375,798, for instance. Yet in both these cases the gaseous fuel is still introduced at the very point from which the "signal" to the zero pressure governor is generated and thus at a pressure less than that of the ambient atmosphere. The same is true in a liquid fuel injection system where an alternate gaseous fuel system uses a venturi to measure and introduce the gaseous fuel, as mentioned in the foregoing patent. If, in order to employ a longer venturi for better pressure recovery, which in turn allows a smaller venturi diameter for better fuel metering, that is, a better "signal", the venturi for gaseous fuel is placed in an air intake trunk well upstream of the liquid fuel carburetor, or in an alternate intake trunk in the case of a liquid fuel injection system, a safety hazard arises in the case of an engine backfire since the entire air trunk downstream of the venturi is filled with a combustible mixture of air and fuel.

So the chief object of the present invention is the provision of a gaseous fuel system for internal combustion engines which avoid the deficiencies and hazards mentioned.

Another object is to do so in a manner which is readily adapted to either liquid fuel carbureted or injected systems having a wide variety of air induction shapes and designs.

A further object is to accomplish the foregoing with relatively little complexity and at relatively small cost.

SUMMARY OF THE INVENTION

The objects of the invention are achieved essentially by a mechanical-pneumatic system which separates the point at which the "signal" is generated from the point at which the gaseous fuel is admitted into the engine's air intake system. The "signal" itself is a negative pressure which reduces in proportion to the increase in air flow in the engine's air intake passage. That increasingly negative pressure in turn results in supply to the engine of a proportionately increasing amount of gaseous fuel at a positive pressure (above that of the ambient atmosphere). In short, the fuel is injected into the engine's air intake system at a positive pressure instead of being sucked into the engine at a negative pressure, as in the case of the systems referred to above.

The ensuing advantages of the foregoing are immediate and significant. First, the gaseous fuel can be injected at any place in the engine's air intake system rather than being restricted to the same point at which the "signal" is generated. Second, and perhaps even more important, it allows the use of a relatively small booster venturi to provide the "signal" since that venturi is thereby relieved of having also to introduce the fuel. And, as previously noted, the use of a booster venturi provides a stronger and thus better "signal" for better control of the air-to-fuel ratio. Third, electronic controls can be used to make adjustments in the relatively small "signal" line from the booster venturi in order to alter the main fuel delivery system and thus provide a "closed loop" system with an $O_2$ sensor in the exhaust stream. In the prior systems referred to that can only be done by controls inserted into the quite large main fuel consequently requires much larger or elaborate components than those necessary for the much smaller "signal" line in the present instance.

The "signal" itself may be generated by a booster venturi, which includes a sensing port opening into its throat, located in turn in the throat of a main venturi which may be placed upstream of the liquid carburetor or upstream of the throttle valve in the case of liquid fuel injection installations. In vehicles which incorporate an air intake passage in the form of a trunk either upstream or downstream of the air cleaner, the main venturi is simply placed within the air trunk itself, thus allowing the use of a much longer venturi for excellent pressure recovery than is possible with carburetor venturis. The "signal", in the form of a varying pressure differential generated by the booster venturi, is applied to a "variable-pressure-controller" which, together with a flow restrictor placed in the fuel delivery line, provides fuel at a proportionately varying positive pressure and thereby a proportionately varying amount of fuel to the engine's air intake system.

In a preferred embodiment the variable-pressure-controller consists essentially of four chambers axially stacked in a cylindrical housing, the first two chambers being separated by a first diaphragm, and the second two chambers by a second diaphragm, the second and third chambers in turn being divided by a rigid partition. The centers of the two diaphragms are associated through the partition in such a manner that movement of one in one direction results in movement of the other in the same direction, that movement in turn being transmitted to a fuel inlet valve opening into the fourth chamber. Fuel from a primary regulator, which is preferably incorporated into the variable-pressure-controller, is applied to the normally closed inlet valve at above atmospheric pressure. The first chamber is connected to the engine's air intake passage upstream of the main venturi and the second chamber to the sensing port of the booster venturi. Hence a pressure differential is created between the first and second chambers proportionate to the rate of air flow through the two venturis. The fourth chamber is connected into the engine's air intake system, either upstream or downstream of the throttle valve, through an adjustable flow restrictor producing a pressure loss proportionate to the pressure differential between the first and second chambers, the greater that pressure differential the greater that pressure loss and vice versa. Finally, the third chamber is connected either to the ambient atmosphere or into the engine's air intake system upstream of the throttle valve.

The operation of the variable-pressure-controller will be explained in more detail later, but briefly the pressure differential between the first and second chamber creates a first force on the first diaphragm and thus also on the second diaphragm which tends to open the fuel valve and allow fuel to flow into the fourth chamber and thence into the engine's intake system through the restrictor. The action of the flow restrictor in turn causes a rise of pressure in the fourth chamber proportionate to the pressure differential between the first and second chambers. The rise of pressure in the fourth chamber creates a second, counter force, balanced against tee pressure in the third chamber, on the second diaphragm which tends to close the inlet valve. When the two forces reach equilibrium, the fuel valve remains in a stationary open position and fuel under pressure is thereby injected into the engine. In that manner does a varying negative pressure sensed by the booster venturi produce an injection pressure and therefore a proportionately varying amount of fuel at a positive pressure into the engine, the air-fuel ratio being determined by adjusting the flow restrictor.

The components of the invention are all relatively simple in nature and correspondingly economical to produce, especially compared to electronic liquid and gaseous fuel injection systems. Other features and advantages of the invention will become apparent from the drawings and the more detailed description which follows.

BRIEF DESCRIPTION OF THE DRAWINGS

FIG. 2 is a sectional view taken along the line 2—2 of FIG. 1.

FIG. 4 is a perspective view, partially in section, of the main and booster venturis employed in the invention.

FIG. 5 is a sectional view of the adjustable flow restrictor used in the invention.

FIG. 6 is a partially schematic illustration of the invention incorporated into a liquid fuel injected internal combustion engine.

DETAILED DESCRIPTION OF A PREFERRED EMBODIMENT (a) Structure of the System

Figure 1:
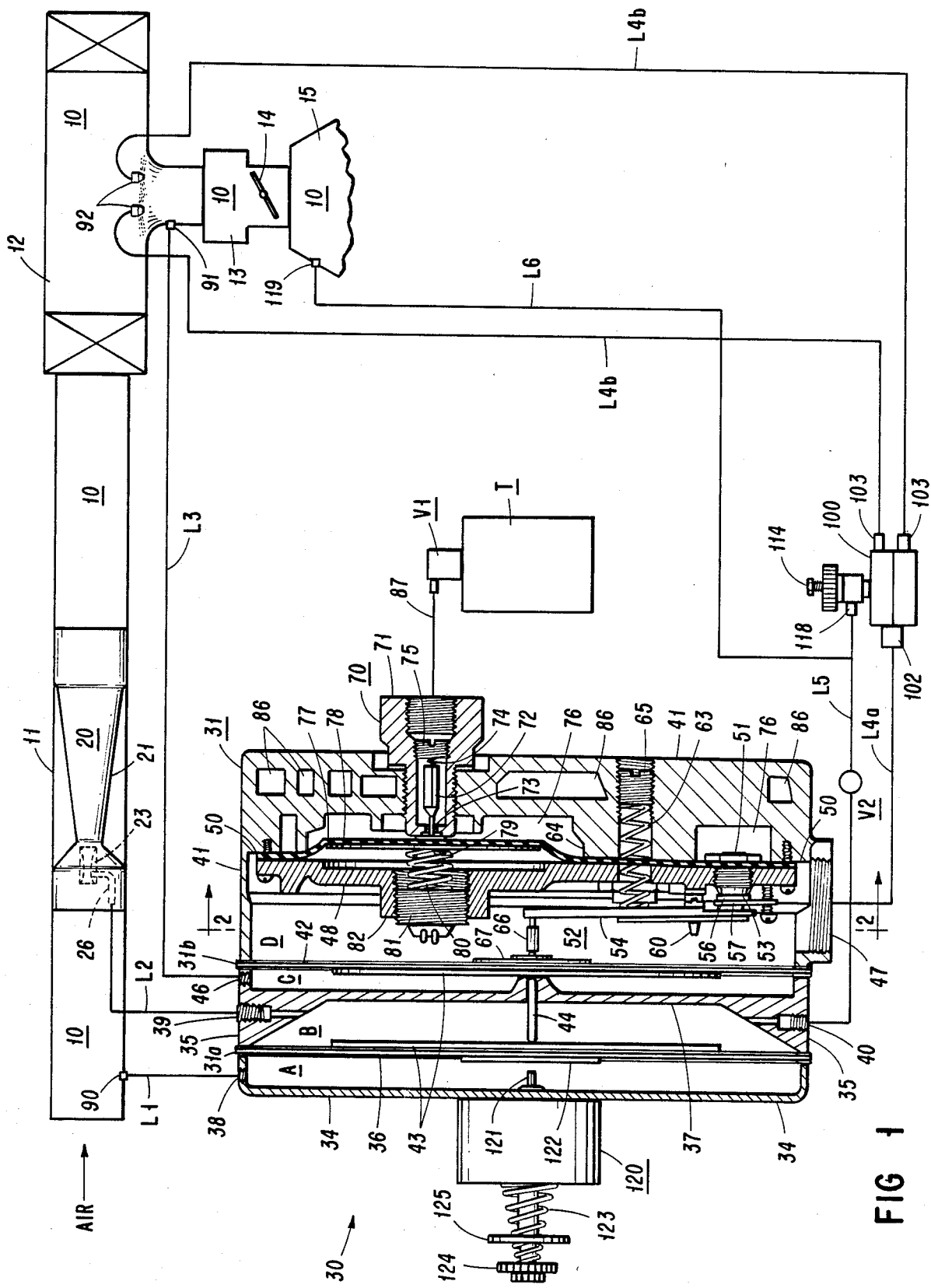
FIG. 1 is a partially schematic illustration of the invention incorporated into a liquid fuel carbureted internal combustion engine, the "variable-pressure-controller" being shown in section.

In FIG. 1 the air intake system, generally designated at 10, of a typical carbureted engine includes an air intake passage or trunk 11 leading to an air cleaner 12 atop a two-barrel carburetor 13 having throttle valves 14 feeding the engine's intake manifold 15. The air cleaner 12, of course, could be at the forward end of the air trunk 11. As noted, the "signal generator", generally designated at 20, may consist of a relatively long main venturi 21 secured within the air trunk 11. Within the throat 22 of the latter and appropriately supported as indicated is a small secondary or booster venturi 23 having a sensing port 24 opening into its throat 25 from which leads a small tubular elbow 26 (see FIG. 4).

The particular "variable-pressure-controller" illustrated, generally referred to at 30, comprises a cast, cylindrical housing 31 diametrically split along its axis at 31a and 31b, the housing 31 being held together by a surround of screws 32 through integrally cast, exterior bosses 33 (see FIG. 2). One end of the housing 31 forms a cover 34 which, together with the intermediate housing section 35, suspends a first flexible intermediate section 35 includes an integrally cast wall 37 which together with the cover 34 forms a pair of first and second chambers, A and B, separated by the diaphragm 36 which is free to move in either axial direction. The cover 34 is provided with a port 38 into the chamber A and the intermediate section 35 with a pair of ports 39 and 40 into the chamber B. The intermediate section 35 and the body 41 of the housing 31 suspend a second flexible diaphragm 42 between a second set of annular gaskets, thus forming a pair of third and fourth chambers, C and D, separated by the diaphragm 42. Both diaphragms 36 and 42 are provided on their opposing faces with large, thin stiff discs 43 in order to increase their effective diaphragm area, and the housing wall 37 is axially bored to receive a floating pin 44 which bears against the two discs 43. The intermediate section 35 is provided with a port 46 into the chamber C and the body 41 with a large fuel outlet 47 from the chamber D.

Figure 3:
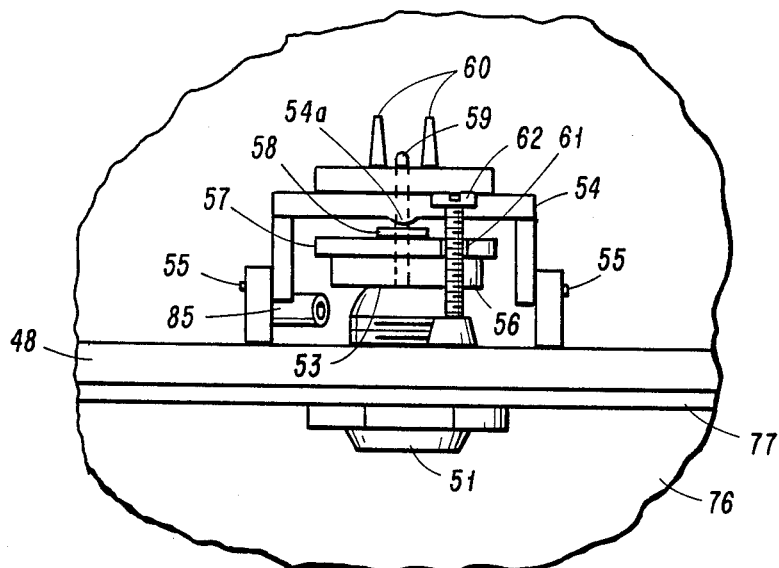
FIG. 3 is a sectional view taken along the line 3—3 of FIG. 2.

The body 41 includes a cast partition 48, which forms the other end of the chamber D, screwed at 49 (see FIG. 2), to an annular seat 50 within the body 41. Referring now to FIGS. 1–3, the orifice 51 of a fuel valve, generally designated a 52, passes through the partition 48 adjacent the fuel outlet 47 and is opened and closed by a valve operating lever 54, fulcrumed at 55 on the partition 48, having an elastomeric disc 56 at one end which engages the seat 53 to close the valve 52. The disc 56 is disposed on the lower face of an elongated fibreboard tab 57 separated from the underface of the lever 54 by a smaller disc 58 which bears against a boss 54a on the underside of the lever 54 (see FIG. 3). The two discs 56 and 58 and the tab 57 are connected by a thin wire retainer 59 which passes centrally up through the discs 56 and 58 and swively through the valve lever 54. The retainer 59 is then bent at right angles and loosely located between a pair of upstanding tangs 60 atop the lever 54 (see FIG. 3). The swivel connection of the discs 56 and 58 and the tab 57 to the lever 54 thus assures an even pressure of the disc 56 on the valve seat 53 when the valve 52 is closed. Furthermore, as seen in FIG. 2, the tab 57 includes a nose having a notch 11 directed toward the fuel outlet 47 and offset to the right of the longitudinal center line of the tab 57, the notch 61 receiving and riding along a headed pin 62 upstanding from the partition 48. As the valve lever 54 opens the nose of the tab 57 abuts the head of the pin 62 causing the tab 57 and thus the disc 56 to tilt, owing to their swivel connection to the lever 54 and the boss 54a of the latter, so that the left side of the disc 56 as viewed in FIGS. 2 and 3 is higher above the seat 53 than is its right side, all for purposes to be described. The valve 52 is biased to its closed position by a compressible coil spring 63 up through a bore 64 in the body 41, the spring 63 engaging the underside of the valve lever 54 between its far end and the fulcrum 55. The spring 63 is retained by a plug 65 threaded into the bore 64 in order to adjust the spring pressure on the valve lever 54. Finally, the far end of the lever 54 is swively attached to the lower end of a pin 66 whose upper end in turn is swively attached to a small, thin metal disc 67 secured to the adjacent face of the diaphragm 42.

The variable-pressure-controller 30 preferably also incorporates a primary regulator of the gaseous fuel, which regulator in this case is disposed in the body 41 on the other side of the partition 48. For this purpose the end wall of the body 41 is bored and threaded to receive a primary fuel valve, generally designated at 70, consisting of an annular fitting 71 which spacedly surrounds a typical needle valve 72 operative in an orifice 73 at the inner end of the fitting 71. A light, compressible coil spring 74, backed b an annular threaded plug 75, urges the valve 72 into sealing engagement with the orifice 73. The latter orifice opens into a primary fuel chamber 76 in communication with the orifice 51 of the valve 52. The nose of the needle valve 72 abuts a small metal disc on one face of an elastomeric, circular diaphragm 77 clamped between the partition 48 and its annular seat 50 in the body 41. The effective area of engaging the other face of the diaphragm 77 and coaxial with the needle valve 72. The disc 78 is laterally located by a central boss 79 upstanding from its other face and encompassed by a strong, compressible coil spring 80 received in turn in the well of a plastic plug 81 threaded into an integral boss 82 on the partition 48. The plug 81 thereby adjusts the pressure of the spring 80 on the disc 78 and thus on the needle valve 72 which is normally held off its seat on the orifice 73 by the pressure of the spring 80. A port 83 (see FIG. 2) opens through the partition 48 onto the disc 78 through a fitting 84 from which a small metal tube 85 leads adjacent the left side, as viewed in FIGS. 2 and 3, of the valve seat 53 of the valve 52. Finally, the body 41 about the inlet valve 70 and the primary chamber 76 are cast with water passages 86 (not needed in the case of fuels already in a gaseous condition) for supply of hot water from the engine's cooling system to assist passage of the fuel entering the primary fuel valve 70 and chamber 76 from a liquid to a gaseous state.

The operation of the primary regulator will be apparent to those skilled in the art, but briefly the gaseous fuel in liquid form or high pressure gaseous state is led from the tank T and solenoid shut-off valve V1 through a line 87 to the inlet fitting 71, thence around the needle valve 72, and through the orifice 73 into the primary chamber 76. The spring 80 is set to provide a nominal 3 psi in the chamber 76. When that pressure is reached the diaphragm 77 and disc 78 compress the spring 80 allowing the needle valve 72 to seat on the orifice 73 until the pressure in the chamber 76 falls when the fuel valve 52 opens, whereupon the spring 80 reopens the needle valve 72 and the cycle repeats itself. In order to compensate for the decrease in the force of the spring 80 as it expands which, when the fuel valve 52 opens, may allow the pressure in chamber 76 to drop below 3 psi, as well as advantageously to provide a pressure in chamber D somewhat greater than 3 psi when the fuel valve 52 is open, the aforementioned tilt of the disc 56 of the valve 52 directs gas under pressure from the orifice 51 into the tube 85 and then through the port 83 into the area between the partition 48 and the disc 78. The sum of the forces provided by the gas pressure and the spring 80 thus holds the needle valve 72 off the orifice 73 until the pressure in the primary chamber 76 stabilizes at a new higher pressure.

The chamber A is fluid connected by a line L1 from its port 38 to a port 90 in the air trunk 11 upstream of the signal generator 20, and the chamber B in turn by a line 22 from its port 39 to the elbow 26 of the booster venturi 23. The chamber C for best control of the air-fuel ratio is preferably fluid connected by a line L3 from its port 46 to a port 91 in the air horn of the carburetor 13 of the carbureted version of the invention shown in FIG. 1. Alternately the chamber C could be connected into the air intake system 10 at any place upstream of the throttle valve 14 or simply vented to the atmosphere. The fuel outlet 47 from the variable-pressure-controller 30 and thus its chamber D is fluid connected by a large line L4a to an adjustable flow restrictor, generally designated at 100, and thence by lines L4b to a pair of fuel nozzles 92, one for each throat of the carburetor 13, preferably disposed adjacent the port 91. The fuel valve 52, the chamber D, the line L4a, the flow restrictor 100, and the lines L4b thus all constitute a fuel passage from the primary regulator or other source of fuel to the engine's air intake system 10. The nozzles 92 are of any suitable construction which serves to spray the fuel generally radially in order to obtain excellent mixing of the gaseous fuel with the incoming air, better than that obtained when gaseous fuel is merely sucked into the throat of a venturi as in the prior art arrangements previously mentioned.

The flow restrictor 100 (see FIG. 5) consists of a hexagonal fitting 101 having an inlet 102 for connection to the line L4a and a pair of outlets 103 for connection to the two lines L4b in the carbureted version of FIG. 1. Within the fitting 101 between the inlet and outlet 102 and 103 is a chamber 104 into which through the side of the fitting 101 is adjustably threaded a sleeve 105 at one end of a fitting 106 having an enlarged annular chamber 107 at its other end closed by a threaded end cap 108. Once the proper intrusion of the sleeve 105 into the chamber 104 is roughly determined (as hereafter set forth), it is held there by a large lock nut 109 on the sleeve 105 operative against the fitting 101. The sleeve 105 receives a sliding piston 110 having a head 111 in the chamber 107 against whose end bears a bellows 112 secured between the fitting 106 and the end cap 108. A compressible coil spring 113 encompasses the piston head 111 between the bellows 112 and the other end of the chamber 107. A screw 114, encompassed by a compressible coil spring 115, for adjustment of the stroke of the piston 110 relative to the sleeve 105 is threaded axially through the end cap 108 and bears against the inner end of the bellows 112 through a small metal disc 116. The interior of the bellows 112 is open to the atmosphere through a port 117 in the end cap 108 and the chamber 107 is ported through a fitting 118. The latter fitting is fluid connected by a line L5 to the second port 40 of the variable-pressure-controller chamber B and by a line L6 to a port 119 into the engine's intake manifold 15 downstream of the throttle valves (b) Operation of the System in the Carbureted Version When the ignition key is turned to its "start" position, a primer solenoid 120 on the exterior of the variable-pressure-controller cover 34 is activated. The solenoid 120 includes a plunger 121 extending through the cover 34 centrally into the chamber A adjacent a small disc 122 attached to the diaphragm 36. The plunger 121 is held in its retracted position (as shown in FIG. 1) by a spring 123 and its stroke is controlled by a hand screw 124 which adjusts the distance between a stop collar 125 on the plunger 121 and the housing of the solenoid 120. When the solenoid 120 is activated its plunger 121 moves the diaphragm 36 to the right in FIG. 1, and through the pin 44, diaphragm 42 and pin 66, thus depresses the valve lever 54 to open the fuel valve 52. If the engine turns over, as detected at the distributor or elsewhere, the solenoid shut-off valve V1 on the tank T is opened allowing fuel to flow through the line 87 into the primary fuel inlet valve 70, thus pressuring the primary chamber 76 with gaseous fuel at a nominal 3 psi in the manner previously set forth. It will be understood, of course, that the pressure of the valve spring 63 on the valve lever 54 is adjusted by the plug 65 to just hold the valve 52 closed against the 3 psi pressure at the valve seat 53. A small quantity of fuel then flows through the open valve 52 into the chamber D and thence through the flow restrictor 100 to the fuel nozzles 92. When the engine starts, the ignition key is returned from its "start" position, the solenoid 120 is deactivated and its plunger 121 returned to its retracted position.

Thereafter, as the throttle valves 14 are opened, air flows through the air trunk 11 and the signal generator 20, whereby the booster venturi 23 creates a first pressure differential between the pressure at the port 90 and the pressure at the sensing port 24 of the booster venturi 23, which pressure through the air trunk That pressure differential is communicated through lines L1 and L2 to chambers A and B of the variable-pressure-controller 30, thus creating a first force which moves the diaphragms 36 and 42 to the right in FIG. 1 and further opens the valve 52 in the manner just explained. Additional fuel then flows into the chamber D at greater than atmospheric pressure and thence through the flow restrictor 100 to the fuel nozzles 92 for injection into the engine at a positive, above atmospheric pressure. The increased rate of fuel flow causes a rise in pressure in chamber D owing to the action of the flow restrictor 100 inasmuch as the restriction or pressure drop provided by the latter increases with the increase in the rate of flow through it, which increase is proportionate to the increase in the first pressure differential between the chambers A and B created by the increase in the rate of air flow through the signal generator 20. A second pressure differential is thereby created between the chambers C and D since the pressure in chamber C is substantially only atmospheric or slightly less depending upon whether that chamber is vented to the atmosphere or connected into the air intake system 10 upstream of the throttle valve 14. The second pressure differential imposes a second force on the diaphragm 42 counter to that of the first force imposed thereon by the diaphragm 36, which second force owing to the pins 44 and 66 tends to move the diaphragms 36 and 42 to the left in FIG. 1 and thus to close the valve 52. When the two forces equalize, the valve 52 assumes an open position consonant with the rate of air flow through the signal generator 20 which in turn of course is determined by the setting of the throttle valves 14. The two forces rise and fall and the valve 52 thus opens and closes in proportionate synchronization with the changing flow in the air trunk 11. The chamber B is also preferably subjected through the lines L5 and L6 to the subatmospheric pressure in the intake manifold 15 in order to hold the valve 52 open at engine idle speeds when the rate of air flow through the signal generator 20 is insufficient for that purpose, an adjustable needle valve V2 being inserted in the line L5 to vary the amount of vacuum applied to the chamber B. This is merely one of several ways in which that can be accomplished in the present instance and is not critical to the essential operation of the system.

The air-fuel ratio is adjusted at the flow restrictor 100. The screw 114 is first turned to bottom the piston 110 in the chamber 177 of the fitting 106. Then a "cruise" setting is made by loosening the lock nut 109 and turning the fitting 106 one way or the other while the engine is running in order to vary the intrusion of the piston 110 into the chamber 104, and thus the restriction provided by the restrictor 100. That in turn increases or decreases the pressure in the chamber D of the variable-pressure-controller 30 and thus the opening of the valve 52 for a given rate of air flow through the signal generator 20, i.e., engine speed. Adjustment of the stroke of the piston 110 is then made by backing-off the screw 114 which allows the piston 110 to retract relative to the sleeve 105 of the fitting 106. The flow restrictor 100 thence functions as an "economizer" valve at light engine loads. Intake manifold vacuum is applied through the lines L5 and L6 to the restrictor chamber 107 through the fitting 118, whereby the pressure in the chamber 107 is less than the atmospheric pressure within the bellows 112 owing to the port 117. When that vacuum rises to a predetermined value, based on the effective area of the bellows 112 and the strength of the spring 113, the bellows 112 moves the piston 110 further into the chamber 104, thus increasing the pressure drop across the restrictor 100 and reducing the opening of the valve 52 in the manner described.

(c) The Fuel Injected Version

Turning to FIG. 6, the invention and its operation as incorporated into a typical liquid fuel injected engine is essentially the same as in the carbureted version and primed, identical reference numerals have been used for corresponding parts. The incoming air passes through the air cleaner 12, at the head of the air intake passage or trunk 11', through the signal generator 20, in the air intake trunk 11', thence through the air meter AM, past the throttle valve 14', into the intake manifold or plenum chamber 15', and finally through individual ram-pipes RP into the engine, liquid fuel being introduced by injectors I at the downstream ends of the ram-pipes RP and the gaseous fuel injected by a nozzle 92' upstream of the throttle valve 14'. Alternately, a fuel line L4b'' and a nozzle 92'' could enter the air intake passage 10' downstream of the throttle valve 14', as indicated by broken lines in FIG. 6. Or separate lines L4b''' and nozzles 92''' could be provided for each of the ram-pipes RP, as indicated by alternate broken lines in FIG. 6. However, when the gaseous fuel is injected downstream of the throttle valve 14', the flow restrictor 100' is thereby subjected to a variable negative pressure or vacuum ranging from a high at idle or light engine loads when the throttle valve 14' is nearly closed to almost zero when the throttle valve 14' is wide open. Such a variable vacuum would obviously upset the function of the flow restrictor 100' and thus the amount of fuel supplied by the variable-pressure-controller 30'. In order to compensate for that it is necessary to incorporate a device such as a "vacuum regulator" 130 in the line L4b'' or L4b''', as the case may be, entering the air intake system 10' downstream of the throttle valve 14', as indicated in FIG. 6.

Figure 7:
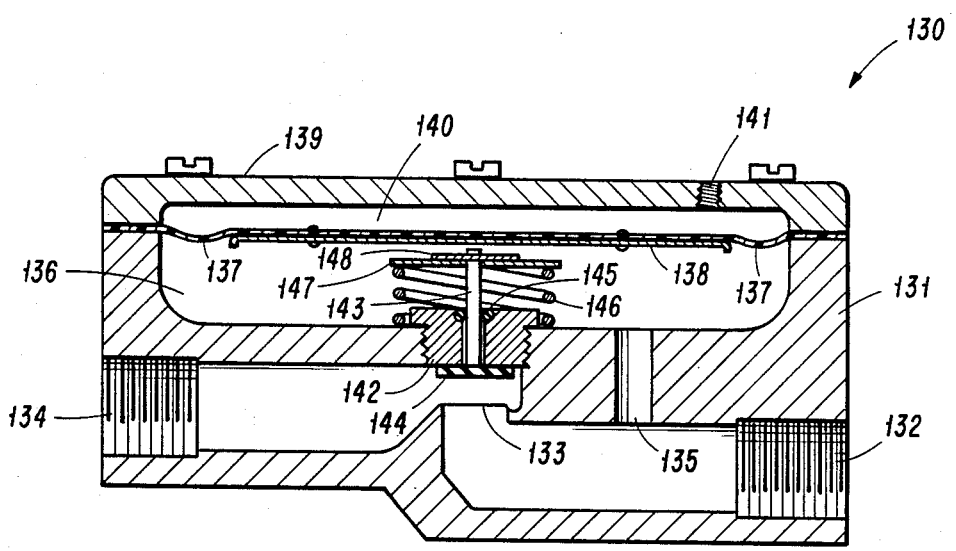
FIG. 7 is a sectional view of a vacuum regulator for use with the variable-pressure-controller in certain engine applications.

Such a vacuum regulator is illustrated in more detail in FIG. 7 and comprises a cast cylindrical housing 131 having an inlet passage 132, at the inner end of which is a valve seat 133, and an outlet passage 134. The inlet passage 132 communicates through a bore 135 with a chamber 136 formed in the housing 131 below a flexible diaphragm 137 to whose lower face is attached a circular metal plate 138. Above the diaphragm 137 an end cap 139 clamps the diaphragm 137 in place and forms with it a second chamber 140 which is connected through a port 141 and a line L7 into the air intake system 10' between the throttle valve 14' and the signal generator 20'. Above the valve seat 133 a plastic plug 142 is threaded into a bore in the housing 131 communicating with the chamber 136. The stem 143 of a disc valve 144, engageable with the seat 133, passes up through a bore in the plug 142 into the chamber 136 just below the plate 138 and is sealed against leakage through the plug 142 by a small O-ring 145. A compressible coil spring 146 around the plug 142 and stem 143 is captured between the floor of the chamber 136 and a metal disc 147 secured to the upper end of the stem 143 by a suitable retainer 148, the spring 146 biasing the valve 144 to its openmost position shown in FIG. 7. The inlet passage 132 is connected to the outlet 103' of the flow restrictor 100, and the outlet passage 134 to the fuel nozzles 92'' or 92''', as the case may be.

The flow restrictor 100' is subjected to the variable negative pressure or vacuum downstream of the throttle valve 14' through the regulator passages 132 and 134 and the open valve 144. When that vacuum reaches a prescribed amount, which is determined by the effective area of the diaphragm 137 and the strength of the spring 146, it is communicated through the bore 135 to the chamber 136 below the diaphragm 137, thus causing the latter to decrease the opening of the valve 144 inasmuch as the chamber 140 above the diaphragm 137 is at a greater pressure owing to the connection through the line L7 into the air intake system 10' at 149. Since there is then a greater restriction between the regulator inlet and outlet passages 132 and 134, pressure builds up in the inlet passage 132 and thus in the chamber 136 through the bore 135 owing to the fact that fuel is being supplied from the flow restrictor 100' at above atmospheric pressure. As the pressure in chamber 136 rises the diaphragm 137 increases the opening of the valve 144 until the pressure once again decreases in the chamber 136. The valve 144 thus cycles back and forth with the result that a substantially constant pressure, substantially equal to that in the air intake system 10' between the throttle valve 14' and the signal generator 20', is maintained in the inlet passage 132 and thus at the flow restrictor 100', a pressure independent of whatever may be the pressure downstream of the throttle valve 14'. In both cases in which the gaseous fuel is injected downstream of the throttle valve 14', the connection 91' of the chamber C of the variable-pressure-controller 30' remains upstream of the throttle valve 14' in order not to upset the function of the variable-pressure-controller 30'. Obviously similar alternatives could be applied pipes are used in conjunction with one or more carburetors.

(d) Summary

From all of the foregoing it will be clear that the components of the system of the invention are all relatively "simple" in structure and thus readily manufactured at relatively small cost, especially compared with electronic systems. Furthermore, the system is far more versatile than electronic ones because it is readily adaptable to a wide variety of engine sizes, that is, the same components can be used without change (except in some instances for the size of the signal generator 20), something impossible in the case of electronic systems. It can be applied as an alternate to a liquid fuel system (as shown) or to an engine operable on gaseous fuel alone. And it is easy and economical to install and service. Moreover, the components are all of modest size and weight, a suitable signal generator 20 having its main venturi 21 spun from aluminum and about 7 inches in length and 2½ inches in diameter. The variable-pressure-controller housing 31 is an alloy casting with an overall length oof about 4½ inches and a diameter of about 6½ inches, the total weight of the variable-pressure-controller 30 being a bit over 5 pounds. The system will function with most any liquefied or compressed petroleum or gaseous fuel: propane, butane, natural gas, even with hydrogen gas.

(e) Variations of the Invention

The invention is also capable of different embodiments without altering its essential function. For instance, the primary regulator need not be incorporated into the variable-pressure-controller 30. The diaphragms 36 and 42 could instead be bellows or even pistons. Nor need the diaphragms 36 and 42 be of the same size inasmuch as it will be obvious that the necessary opposing forces on the valve 52 could be provided without requiring the diaphragm or like areas producing those forces to be equal since it is their effective areas multiplied by the pressures concerned that are important. The four chambers A–D could be arranged other than as shown, for instance, chambers A and B could be more remote from chambers C and D and other linkages arranged between them to operate the fuel inlet valve 52. That valve itself could be of some other design as well. The variable-pressure-controller 30 will also function if the chamber A simply communicates with the atmosphere instead of the air trunk 11 upstream of the signal generator 20 which is preferable in order to compensate for the increased air pressure in a forwardly directed air intake trunk owing to vehicle movement. Furthermore, the valve 52 and the flow restrictor 100 could be located in a fuel line or passage leading directly from the primary regulator to the engine's air intake system 10, the fuel passing first through the valve 52 and thence through the restrictor 100 without passing through the chamber D of the variable-pressure-controller 30. The chamber D in that case would then need only communicate with the fuel passage between the valve 52 and the flow restrictor 100 since it is the pressure upstream of the restrictor 100 which must be applied to the chamber D in order for the variable-pressure-controller 30 to function, all without altering the essential nature and operation of the invention. If in addition in that case the fuel valve 52 were to take the form of a shuttle-type spool valve disposed in the fuel passage downstream of the flow restrictor 100 and connected at its ends to the diaphragms 36 and 42, the chamber C were to connect into the fuel passage between the spool valve and the flow restrictor 100, and the chamber D were to connect into the fuel passage between the primary regulator and the restrictor 100, the variable-pressure-controller 30 would also function as a differential pressure regulator and eliminate the need for a vacuum regulator 130 in those instances in which the fuel is injected downstream of the throttle valve.

The signal generator 20 itself can be placed elsewhere in the air intake system 10 or 10', such as downstream of the throttle valves 14 or 14', and the system still essentially function as described. Indeed, the signal generator 20 could be of some other nature, such as a Pitot tube, or a single, very long venturi with a small throat and sensing port thus eliminating the need for a booster venturi, in short, any turbulent (non-laminar) flow device which will produce a pressure differential proportionate to the rate of air flow into the engine. The flow restrictor 100 could be incorporated into the variable-pressure-controller 30. It could even be a simple fixed orifice, though that would require different sized orifices for different engines, or some other turbulent (non-laminar) flow device producing a restriction proportionate to the pressure differential created by the signal generator 20 could be used. Other aspects of the essential operation and parameters of the invention will be apparent to those of skill in the art. Hence, though the invention has been described in terms of a particular embodiment, being a best mode known of carrying out the invention, it is not limited to that embodiment alone. Instead, the following claims are to be read as encompassing all adaptations and modifications of the invention falling within its spirit and scope.

We claim:

1. A mechanical-pneumatic gaseous fuel injection system for an internal combustion engine having an air intake system including an air intake passage and a throttle valve, the system being characterized by:

(a) air pressure differential generating means for disposition in the air intake passage, the generating means creating a pressure which decreases below that in the air intake passage upstream of the generating means in proportion to the increase in the rate of air flow through the air intake passage;
   (b) a variable-pressure-controller for gaseous fuel, the controller including:
      (i) a housing;
      (ii) first, second, third and fourth chambers disposed in the housing, the first and second chambers being separated by a first wall movable in opposite directions responsive to pressure thereon, the third and fourth chambers being separated by a second wall movable in opposite directions responsive to pressure thereon, the first chamber being fluid connectable to said air intake passage upstream of the pressure differential generating means and the second chamber being fluid connectable to the pressure differential generating means;
      (iii) a gaseous fuel valve disposed at the housing and forming a portion of a gaseous fuel passage for supply of gaseous fuel at above atmospheric pressure from primary regulator means to said air intake system;
      (iv) valve operating means at the housing for opening and closing the fuel valve and operatively associated with the first and second movable walls effective so that progressive movement of the first movable wall in one direction progressively opens the fuel valve and progressive movement of the second movable wall in one direction progressively closes the fuel valve;
   (c) fuel flow restrictor means for forming a further portion of said passage between the gaseous fuel valve and said air intake system;
   (d) the third controller chamber being fluid connectable to said air intake system; and
   (e) the fourth controller chamber communicating with said passage between the fuel valve and the flow restrictor means.

2. The system of claim 1 wherein the fourth chamber forms a portion of said fuel passage, the gaseous fuel valve is disposed upstream of the fourth chamber, and the flow restrictor from said housing.

3. The system of claim 2 wherein the third controller chamber is fluid connectable to said air intake system adjacent the connection thereto through said passage of the flow restrictor means.

4. The system of claim 2 wherein the housing is cylindrical and the controller first, second, third and fourth chambers are disposed in stacked relation to each other along the axis of the housing, the second and third chambers being divided by a stationary diametrical wall within the housing.

5. The system of claim 4 wherein the valve operating means includes a first operating member axially through and axially slidable in the stationary wall, the member having opposite ends in contact with the opposing faces of the first and second movable walls, a valve lever in the fourth chamber and operatively associated with the fuel valve for opening and closing the same, means biasing the valve lever to its valve closing position, and a second operating member in the fourth chamber attached to the lever and the other face of the second movable wall.

6. The system of claim 5 wherein each movable wall comprises a flexible diaphragm, the two diaphragms having equal operative areas.

7. The system of claim 2 wherein the housing further includes primary regulator means fluid connectable to a source of gaseous fuel under pressure, the primary regulator means supplying gaseous fuel to the fuel valve at a pressure less than the pressure of the fuel at the source.

8. The system of claim 7 wherein the primary regulator means supplies gaseous fuel at a substantially constant pressure at the fuel valve when closed and at a progressively increasing pressure as the fuel valve progressively opens.

9. The system of claim 1 wherein the pressure differential generating means includes a primary venturi, a booster venturi operatively disposed in the primary venturi, and an air pressure sensing port opening operatively into the throat of the booster venturi, the variable pressure controller second chamber being fluid connectable to said air pressure sensing port.

10. The system of claim 1 wherein the pressure differential generating means is disposable in said air intake passage upstream of the throttle valve.

11. The system of claim 10 wherein the flow restrictor means is fluid connectable into said air intake system upstream of the throttle valve.

12. The system of claim 10 wherein the flow restrictor means is fluid connectable through said passage into said air intake system downstream of the throttle valve through vacuum regulator means effective to maintain a pressure downstream of the flow restrictor means substantially equal to that in said air intake system between the pressure differential generating means and the throttle valve.

13. The system of claim 1 wherein the controller second chamber is also fluid connectable into said air intake system downstream of the throttle valve through adjustable valve means.

14. The system of claim 1 wherein the flow restrictor means also includes automatic adjusting means fluid connectable into said air intake system downstream of the throttle valve, the automatic adjusting means increasing the flow restriction of the restrictor means responsive to decrease of pressure in the air intake system downstream of the throttle valve and vice versa.

15. A variable-pressure-controller for use in a mechanical-pneumatic gaseous fuel injection system for an internal combustion engine, the controller being characterized by:
(a) a housing;
(b) first, second, third and fourth chambers disposed in the housing and having substantially no fluid communication therebetween within the housing, the first and second chambers being separated by a first wall movable in opposite directions responsive to pressure thereon, the third and fourth chambers being separated by a second wall movable in opposite directions responsive to pressure thereon;
(c) an inlet to the first chamber, at last one inlet to the second chamber, and an inlet to the third chamber, each of said inlets being for connection into the air intake passage of an internal combustion engine;
(d) a gaseous fuel inlet valve opening into the fourth chamber for supply of gaseous fuel under pressure to the fourth chamber;
(e) a gaseous fuel outlet from the fourth chamber;
(f) and valve operating means for opening and closing the fuel inlet valve and operatively associated with the first and second movable walls effective so that progressive movement of the first movable wall in one direction progressively opens the fuel inlet valve and progressive movement of the second movable wall in one direction progressively closes the inlet valve.

16. The controller of claim 15 wherein the housing is cylindrical and the first, second, third and fourth chambers are disposed in stacked relation to each other along the axis of the housing, the second and third chambers being divided by a stationary diametrical wall within the housing.

17. The controller of claim 16 wherein the valve operating means includes a first operating ember axially through and axially slidable in the stationary wall, the member having opposite ends in contact with the opposing faces of the first and second movable walls, a valve lever in the fourth chamber and operatively associated with the inlet valve for opening and closing the same, means biasing the valve lever to its valve closed position, and a second operating member in the fourth chamber attached to the lever and the other face of the second movable wall.

18. The controller of claim 17 wherein each movable wall comprises a flexible diaphragm, the two diaphragms having equal operative areas.

19. The controller of claim 18 wherein the housing further includes a primary regulator having an inlet for connection to a source of gaseous fuel under pressure, the regulator being effective to supply gaseous fuel to the inlet valve at a pressure less than the pressure of the fuel at the source.

20. The controller of claim 19 wherein the primary regulator is effective to supply gaseous fuel to the fuel valve at a substantially constant pressure when the fuel valve is closed and at a progressively greater pressure as the fuel valve is progressively opened.

21. The controller of claim 20 wherein the housing includes electrical means effective when energized to move the first wall in said one direction.

22. A mechanical-pneumatic method of injecting gaseous fuel into an internal combustion engine having an air intake system including an air intake passage characterized by:
(a) creating a first pressure differential in the air intake passage between a first pressure and a lesser second pressure, the first pressure differential proportionately increasing or decreasing as the rate of air flow through the air intake passage increases or decreases;
(b) applying the first pressure to a first chamber;
(c) applying the second pressure to a second chamber separate from the first chamber by a first wall movable in opposite directions responsive to pressure thereon, whereby a first force is imposed on the first movable wall;
(d) creating a second pressure differential between a third chamber and a fourth chamber separated by a second wall movable in opposite directions responsive to pressure thereon, the second pressure differential being created by:
(i) applying a third pressure to the third chamber; and
(ii) applying a fourth pressure greater than the third pressure to the fourth chamber, the fourth pressure being generated by flow of gaseous fuel through a fuel passage connecting a source of said fuel at a positive pressure with the engine's air intake system through gaseous fuel valve means and flow restrictor means, the fourth chamber communicating with the fuel passage upstream of the flow restrictor means, the flow restrictor means providing an increased or decreased restriction to flow of gaseous fuel proportionate to the increase or decrease of the first pressure differential, the fourth pressure and thus the second pressure differential thereby increasing or decreasing proportionate t the increase or decrease of the first pressure differential as the opening of the gaseous fuel valve means is increased or decreased, whereby a second force is imposed on the second movable wall; and (e) operatively associating the first and second movable walls with the gaseous fuel valve means so that the first force tends to open the valve means and the second force tends to close the valve means, the valve means assuming an open position when the first and second forces are equal.

23. The method of claim 22 wherein a variable fifth pressure less than said third pressure is also applied to the second chamber, the fifth pressure decreasing as the first pressure differential increases.

24. The method of claim 22 wherein the restriction provided by the flow restrictor means is also responsive to a fifth pressure effective so that a decrease in the fifth pressure increases said restriction and vice versa.

25. The method of claim 22 wherein the first pressure differential is created by a primary venturi disposed in the air intake passage and a booster venturi disposed in the primary venturi and having an air pressure sensing port opening operatively into the throat of the booster venturi, the air intake passage upstream of the primary venturi being fluid connected to the first chamber and the air pressure sensing port being fluid connected to the second chamber.

26. The method of claim 22 wherein the gaseous fuel valve means is disposed upstream of the fourth chamber and the flow restrictor means is disposed downstream of the fourth chamber, the fourth chamber constituting a portion of said fuel passage.

27. The method of claim 26 including a cylindrical housing containing the gaseous fuel valve means and the first, second, third and fourth chambers in stacked relation to each other along the axis of the housing, the first and second movable walls constituting flexible diaphragms and including a stationary diametrical partition within the housing between the second and third chambers, the four chambers being otherwise constituted by the walls of the housing, said partition having an axially disposed first valve operating member therethrough and axially slidable therein, the valve operating member having opposite ends in contact with the opposed faces of the first and second diaphragms, a second axially disposed valve operating member in the fourth chamber having opposite ends, one end being attached to the other face of the second diaphragm and the other end attached to valve opening and closing means disposed in the fourth chamber for the gaseous fuel valve means, the valve opening and closing means maintaining the fuel valve means in its closed position against said fourth pressure in the absence of said pressure differentials.

28. The method of claim 27 wherein the first chamber is disposed at on end of the housing and wherein the other end of the housing includes a primary regulator constituting said source for supplying gaseous fuel to the gaseous fuel valve means at said fourth pressure.

* * * * *